United States Patent [19]

Takasago et al.

[11] Patent Number: 4,726,004
[45] Date of Patent: Feb. 16, 1988

[54] OPTICAL INFORMATION RECORDING AND REPRODUCING APPARATUS WITH TRACKING SERVO SYSTEM

[75] Inventors: Masahiro Takasago, Odawara; Osami Kushizaki, Hiratuka, both of Japan

[73] Assignee: Hitachi, Ltd., Tokyo, Japan

[21] Appl. No.: 789,825

[22] Filed: Oct. 21, 1985

[30] Foreign Application Priority Data

Oct. 24, 1984 [JP] Japan ................. 59-222067

[51] Int. Cl.⁴ .............................................. G11B 7/00
[52] U.S. Cl. ..................................................... 369/46
[58] Field of Search .................. 358/342, 907; 369/32, 369/44, 45, 46, 111, 124

[56] References Cited

U.S. PATENT DOCUMENTS

| | | | |
|---|---|---|---|
| 4,236,232 | 11/1980 | Jansen et al. | 369/44 |
| 4,539,664 | 9/1985 | Deguchi et al. | 369/44 |
| 4,567,534 | 1/1986 | Groen et al. | 358/342 |
| 4,583,209 | 4/1986 | Bierhoff | 369/46 |

Primary Examiner—Donald McElheny, Jr.
Attorney, Agent, or Firm—Antonelli, Terry & Wands

[57] ABSTRACT

An optical information recording and reproducing apparatus for irradiating a disk-shaped recording medium having spiral tracks with a light beam so that the information recorded along the tracks may be reproduced. The apparatus is equipped with a circuit for detecting the displacement of the light beam from said tracks and a clipping circuit for clipping a tracking error signal or the output signal of said detecting circuit with a predetermined threshold value. The light beam has its position corrected along the tracks in accordance with the output signal of said clipping circuit so that it may be prevented from tracking erratically.

24 Claims, 11 Drawing Figures

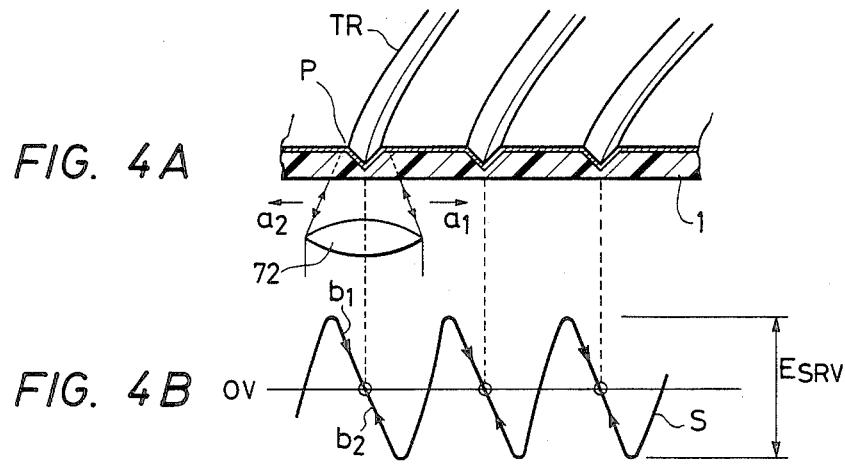
FIG. 4A
FIG. 4B
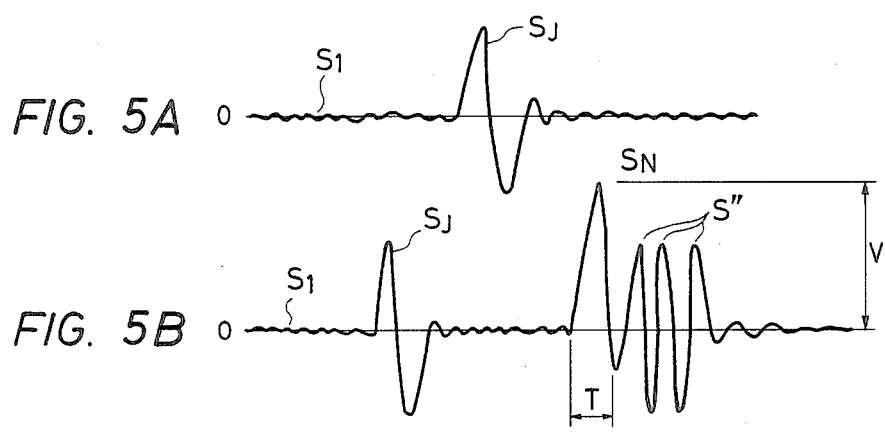
FIG. 5A
FIG. 5B

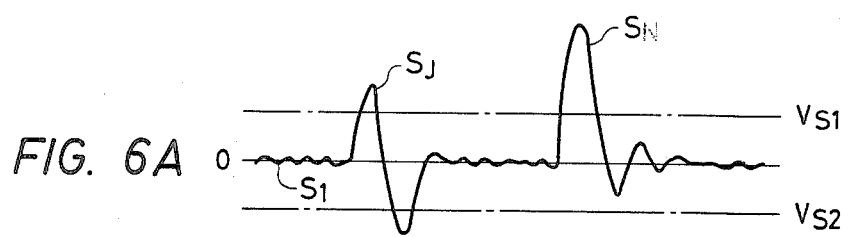
FIG. 6A
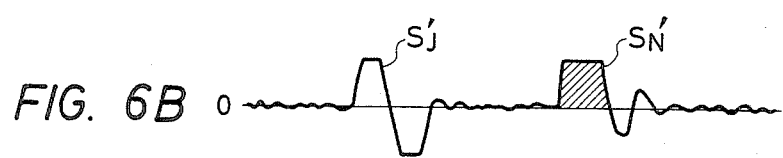
FIG. 6B
FIG. 7
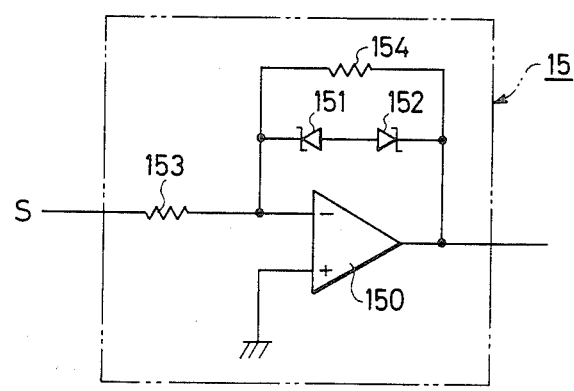

OPTICAL INFORMATION RECORDING AND REPRODUCING APPARATUS WITH TRACKING SERVO SYSTEM

BACKGROUND OF THE INVENTION

The present invention relates to an optical information recording and reproducing apparatus and, more particularly, to an optical information recording and reproducing apparatus having a tracking servo system for positioning a light spot, which is to be irradiated on tracks on a disk-shaped optical recording medium.

There is known in the art an optical information recording and reproducing apparatus which is constructed such that a disk-shaped optical recording medium having a plurality of concentric or spiral tracks for recording information is rotated and irradiated with a laser beam focused by an optical system so that the information recorded on the medium may be read out in terms of the changes in the reflected light. For this apparatus, the tracking operation to position of the light spot to follow the tracks is indispensible. There is disclosed in U.S. Pat. No. 4,363,116, for example, the apparatus of the type in which the recording medium is formed in advance with such grooved guide tracks for the aforementioned tracking operation as have optical characteristics different from those of their surrounding regions so that the information may be recorded on those guide grooves. The light beam emitted from its light source irradiates the aforementioned guide tracks via beam directing means such as a galvanomirror arranged on the optical path, and the reflected light is partially inputted to two-split optical detectors, for example, so that the aforementioned beam directing means is controlled by the differential signal of that optical detector functioning as a tracking error signal. Since the light spot is enabled to follow the tracks on which no information has been recorded, according to the aforementioned tracking system with the guide grooves, this system is especially useful for an apparatus which has the function of additionally writing new information at an arbitrary position on a track.

In the optical information recording and reproducing apparatus of the this kind, however, the light spot formed on the disk surface may have a diameter as small as 1.6 microns. As a result, when the light spot scans a defective position on a track, the defect adversely affects the light spot so as to act upon the beam directing means as a false tracking error signal. In this case, the beam directing means operates to restore the tracking error signal level to zero. If, however, the error signal generated when the defective position is scanned is a strong signal, the light spot strays out of the normal track position to the adjacent track. If this phenomenon occurs during recording, data may be recorded on the wrong track or lost completely.

To prevent erratic tracking during recording or playback, a system has been proposed which is equipped with means for detecting that the tracking error signal exceeds a predetermined value, for example, so that the laser emission may be interrupted as soon as a malfunction is detected by the detecting means (as is disclosed in Japanese Patent Laid-Open No. 57-1501440). With this system, tracking is always interrupted at a defective position on a track; consequently, the defective track cannot be accessed. This makes it necessary to conduct strict inspections upon the recording medium produced so as to reject the medium as a defective if the medium has a defect which will cause erratic tracking.

If erratic tracking is detected during the recording or playback, tracking is interrupted so as to leave the rest of that track unusable thereby reducing the area of the usable recording surface.

SUMMARY OF THE INVENTION

It is therefore an object of the present invention to provide an optical information recording and reproducing apparatus which is equipped with a tracking servo system to prevent erratic tracking.

Another object of the present invention is to provide an optical information recording and reproducing apparatus which will suppress erratic tracking when the spot scans a defective position on the recording medium.

The present invention is applied to an optical information recording and reproducing apparatus for reproducing information, which is recorded along concentric or spiral tracks formed on a disk-shaped recording medium, by irradiating the recording medium with a light beam. The apparatus is equipped with a detecting circuit for detecting the displacement of the light beam from the tracks, and a clipping circuit for clipping a tracking error signal or the output of the clipping circuit so that the position of the light beam may be controlled to follow the tracks in accordance with the output signal from the clipping circuit.

In a preferred embodiment, an optical head unit carries thereon a light source for emitting the light beam, a beam splitter for splitting the light beam reflected from the recording medium, and a galvanomirror for controlling the direction of the light beam with respect to the radial direction of the recording medium. The optical head is driven by drive means such as a voice coil motor to move in the radial direction of the optical disk. The galvanomirror is driven by a control signal called a "jump signal" delivered from a control unit to shift the position of the light beam to an adjacent track. With this construction, either the galvanomirror or the voice coil motor is drive in accordance with the output signal from the clipping circuit so that the light beam is controlled to be positioned accurately on a target track.

In another preferred embodiment, the clipping circuit is realized by a hardware circuit but is not limited thereof. The corresponding function may be realized by a programmable processor. In this modification, the processor is naturally equipped with an analog/digital converter at its input and a digital/analog converter at its output.

Since it is possible with the present invention to suppress the disturbance of the tracking error sigal caused by defects on the optical disk and to prevent the erratic tracking, the reliability of the optical disk apparatus can be improved.

BRIEF DESCRIPTION OF THE DRAWINGS

In FIGS. 4A and 4B show the relationship between the tracks of the optical disk and the tracking error signal;

FIG. 4A is a sectional, perspective view showing a portion of the structure of the optical disk; and FIG. 4B is a signal diagram showing the tracking erorr signal corresponding to the track structure of FIG. 4A.

FIGS. 5A and 5B are a signal wavechart for explaining both the relationship between the tracking error signal $S_1$ and a jump instructing signal $S_J$ and the relationship between the tracking error signal and a noise signal $S_N$ caused by a defect on the optical disk;

FIGS. 6A and 6B are a signal waveform chart for explaining the operation of a clipping circuit 15;

FIG. 7 is a circuit diagram showing one embodiment of the clipping circuit 15.

DESCRIPTION OF THE PREFERRED EMBODIMENTS

Figure 1:
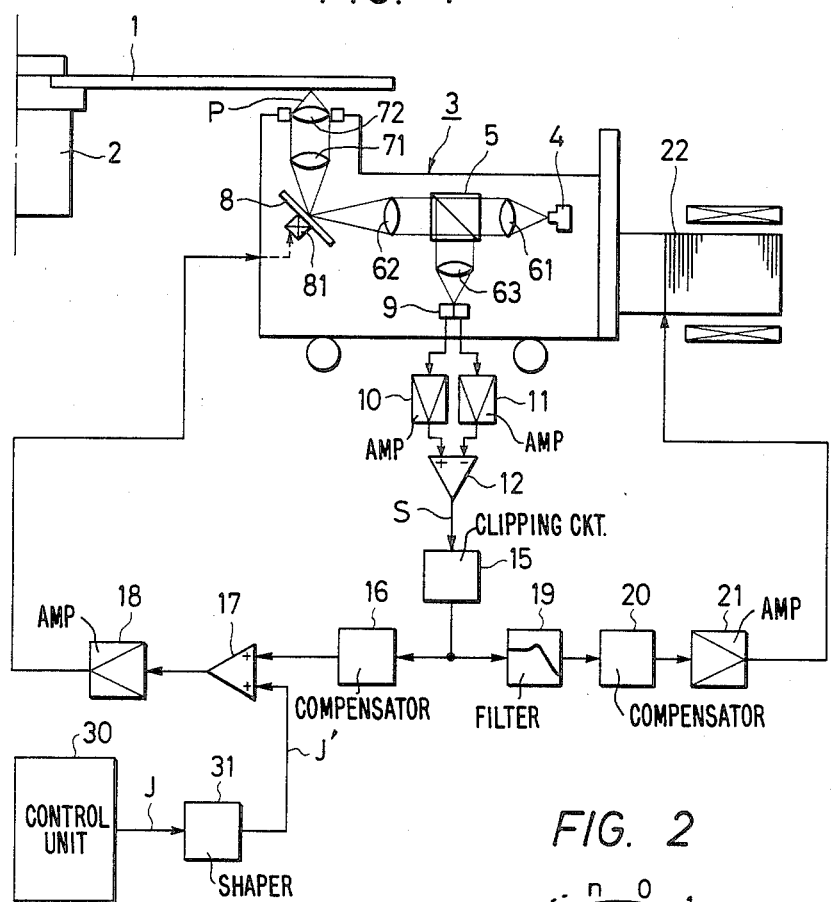
FIG. 1 is a block diagram showing the construction of an optical information recording and reproducing apparatus according to one embodiment of the present invention.

In FIG. 1 showing in a block form the portion of the optical information recording and reproducing apparatus according to the present invention: reference numeral 1 indicates an optical disk or an information recording medium; numeral 2 a spindle motor for turning the optical disk; and numeral 3 an optical head for recording information on and reproducing the same from the optical disk. In FIG. 1, the optical disk 1 and the spindle motor 2 are partially shown.

Figure 2:
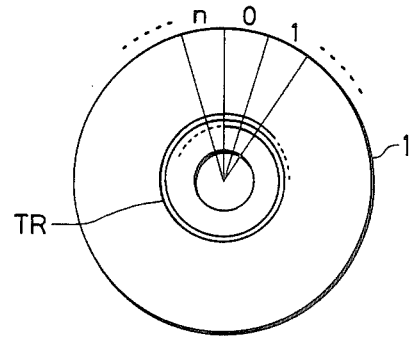
FIG. 2 is a schematic diagram showing an optical disk formed with spiral tracks.

Here, the optical disk 1 is formed, as shown in FIG. 2 or FIG. 4A, with continuing spiral tracks TR having a grooved structure. In other words, the plural tracks are so defined on the optical disk 1 that one is assigned to one turn.

Figure 3:
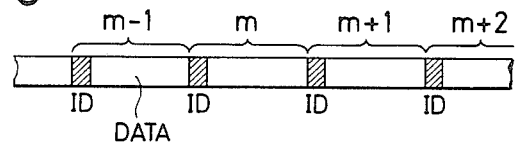
FIG. 3 is a diagram showing the structure of a portion of the tracks.

Each track is divided into $(n+1)$ to sectors numbered 0 to n. Moreover, each sector is composed, as shown in FIG. 3, of ID portions recorded with sector addresses or other control information, and DATA portions extending from the former for recording data.

The optical head 3 is constructed of: a semiconductor laser 4 for emitting a light beam; and optical system composed of a beam splitter 5 and lenses 61, 62, 71, 72 and so on; and a galvanomirror 8 for controlling the direction in which the light beam is reflected. The light beam emitted from the semiconductor laser 4 is directed to the optical disk 1 via the above-specified optical system and the galvanomirror 8 so that it is focused in the form of a light spot P having a diameter of about 1.6 microns on the surface of the optical disk 1. The light reflected from the optical disk 1 is guided in the direction opposite to its incident direction, i.e., via the lenses 72 and 71 and is reflected by the galvanomirror 8 until it reaches the beam splitter 5 via the lens 62. In this beam splitter 5, moreover, the light is separated from the incident light so that the light separated is incident via a lens 63 upon an optical detector 9 which is divided into two halves to detect tracking error.

The optical head 3 is further equipped with not only an optical system and a detector for generating a focus error signal for automatically controlling the focal point of the light spot P irradiating the optical disk 1 by driving the objective lens 72 but also an optical system and a detector for generating a read signal from the reflected light so as to reproduce the information. These additional parts are omitted from FIG. 1, because what is concerned with the present invention is not how to generate the focus error signal or the read signal but the tracking servo system. As to the former, incidentally, reference should be made to the disclosures of U.S. Pat. Nos. 4,293,944 and 4,357,696, for example.

The first output from the optical detector 9 exhibits a displacement of the center of the light spot P in the direction $a_1$ (as viewed from FIG. 4A) from the center of the tracks whereas the second output exhibits a displacement in the opposite direction $a_2$. The respective outputs of the optical detector 9 are amplified by amplifiers 10 and 11, respectively, and are input to a differential amplifier 12. In this differential amplifier 12, a difference between the two signals is taken to produce a tracking error signal S. This tracking error signal S varies in accordance with the displacement between the center of the light spot P and the center of the information tracks. This phenomeon will be explained with reference to FIGS. 4A and 4B. Specifically, FIG. 4A shows the relationship between the tracks TR of the optical disk 1 and the light spot P, and FIG. 4B shows the waveform of the track error signal S corresponding to FIG. 4A. When the light spot S is shifted in the radial direction (i.e., in the directions of arrows $a_1$ and $a_2$) of the optical disk 1 across the tracks TR, as shown in FIG. 4A, the tracking error signal S varies sinusoidally, as shown in FIG. 4B, so that it takes a value of zero at the center of the tracks TR and its positive or negative peak at both the ends of the tracks TR. Under the tracking servo applied, the light spot P has it position corrected inward or outward in accordance with the positive or negative value of the error signal S so that it is controlled to follow the center of each track TR, as shown by arrows $b_1$ and $b_2$ in FIG. 4B. Letters $E_{SRV}$ appearing in FIG. 4B indicate the voltage amplitude of the tracking error signal S.

In FIG. 1, the tracking servo system is equippied with: a circuit 15 for clipping the maximum of the tracking error signal at a predetermined value; a compensator 16 for stabilizing the servo system; a signal adder 17 to be fed with the output of that compensator 16 and a track jump signal J' which will be described later; and a power amplifier 18. The output of this power amplifier 18 is applied to a driver 81 to drive the galvanomirror 8 so that the position of the light spot P is controlled. The control range of the light spot by the galvanomirror 8 is limited preferably to about ±100 microns. For this purpose, in the tracking servo system of the embodiment, the output of the clipper 15 is applied to a low-pass filter 19, in which the low-frequency component of the tracking error signal S is extracted. The output of the low-pass filter 19 is input to a compensator 20, in which the low-frequency component of the tracking error signal is stabilized by the servo system. The output of the compensator 20 is fed via a power amplifier 21 to a voice coil motor 22 so that this motor 22 is driven. This motor 22 moves the optical head 3 in the radial direction of the disk to correct the displacement of the galvanomirror 8, i.e., to reduce the displacement.

Under the state in which the light spot P follows one track, a jump pulse is applied so as to jump the light spot P to an adjacent track. This pulse J is output from a control unit 30 to a waveform shaper 31, in which its waveform is shaped. More specifically, the control unit 30 memories the position of the track TR having a light spot P to output the pulse J to be jumped. The jump signal J', i.e., the outut of the waveform shaper 31 is fed to the signal adder 17, in which it is added to the aforementioned tracking error signal S. The output of this adder 17 is fed via the amplifier to act as a control signal for driving the galvanomirror 8.

FIG. 5(A) shows the tracking error signal S which is fed back and is detected by the optical detector 9 after the jump signal J' has been applied. In other words, the signal S is the summation of a tracking error signal $S_1$ which varies finely to take a positive or negative value at the track center, and a jump instruction signal $S_J$, so that the light spot P is displaced largely in response to the signal $S_J$ and is positioned generally at the center of the adjacent track. As a result, by feeding the aforementioned jump signal J' to the signal adder 17 at a predetermined time interval, the light spot P can be sequentially and continuously shifted to the adjacent tracks or made to scan the same track in a repeated manner. Here, as the light spot P moves in the radial direction of the optical disk 1, the optical head 3 is driven by the voice coil motor 22 to move in the radial direction of the disk to correct the displacement of the galvanomirror 8.

Here, in case there exists on the tracks TR such a relatively large flaw that will vary the reflected light of the light spot P, the reflected light abruptly varies. If, in this case, it were not for the clipping circuit 15, high amplitude noise as indicated at $S_N$ in FIG. 5(B), would appear in the tracking error signal S. The signal $S_N$ act as random disturbance so that the light spot P strays the instant track to cross several tracks, as indicated at S". It depends upon the amplitude V and the duration T of the signal $S_N$ caused by the flaw whether the signal $S_N$ has an energy sufficient to cause the light spot P to track erratically. If countermeasures are taken only to set the threshold values of the amplitude V and the duration T so that writing may be interrupted when noise $S_N$ exceeding those threshold values appear, the threshold value of the duration T has to be set to a small value so as to cope with erratic tracking for a small value of T and for a very large value of V. As a result, even when the tracking is not extremely erratic, e.g., when the value V is not so large but the value T is large, writing is frequently interrupted, thereby reducing the efficiency of the optical disk apparatus.

With the clipper 15, of the present invention, positive and negative threshold values $V_{S1}$ and $V_{S2}$ can be set for the tracking error signal S, as shown in FIG. 6(A), so that the amplitude of the signal to be input to the tracking servo system can be so limited as is shown in FIG. 6(B). Then, regardless of the amplitude of the noise signals $S_N$ caused by the defect on the optical disk, there is no danger of erratic tracking so long as the duration T exceeds a predetermined value. Therefore, the following failsafe measure is taken: the threshold value of the duration T is set at such a relatively large value determined on the basis of the amplitude threshold values $V_{S1}$ and $V_{S2}$ as will not cause the light spot to stray out of the tracks so that writing, for example, may be interrupted only when the noise signals $S_N$ exceeding those values $V_{S1}$ and $V_{S2}$ arise. Then, as has been described above, the disadvantage that the operation is interrupted by a flaw even when the track is correct can be eliminated so as to improve the efficiency of using the tracks on the optical disk.

FIG. 7 shows one example of the clipper 15. This circuit is composed of an operation amplifier 150, Zener diodes 151 and 152 and resistors 153 and 154. The tracking error signal S is clipped by the Zener diodes 151 and 152 when it exceeds the Zener voltage.

Figure 8:
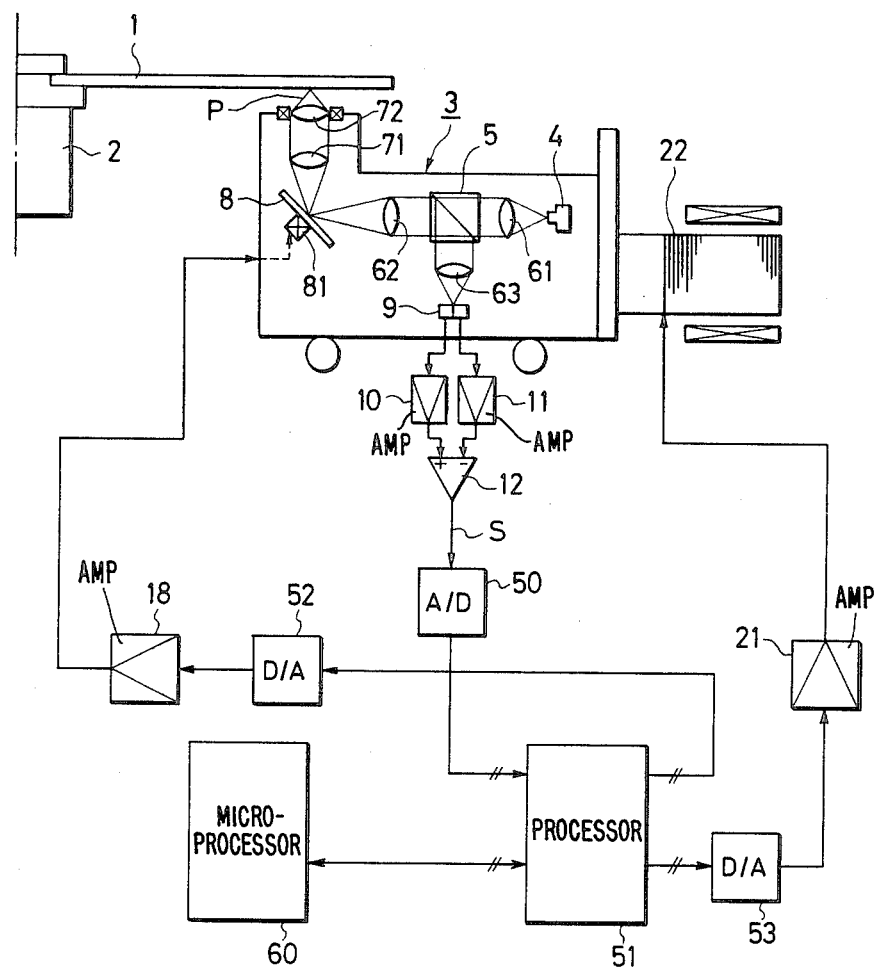
FIG. 8 is a block diagram showing the construction of the optical information recording and reproducing apparatus according to another embodiment of the present invention.

FIG. 8 shows another embodiment of the tracking servo system. Here, the same parts as those of FIG. 1 are indicated at the same reference characters. Duplicate explanations of the parts shared with those of FIG. 1 are omitted.

In this embodiment, the tracking sero system of FIG. 1 is partially replaced by a digitial circuit. Specifically, the tracking error signal S is converted to a digital signal by an A/D converter 50. The output signal of this converter 50 is fed to and processed by a digital signal processor 51. One output of this processor 51 is converted to an analog signal by a D/A converter 52 to control the galvanomirror 8 via the amplifier 18. The other output of the processor 51 is likewise fed via a D/A converter 53 and the amplifier 21 to control the voice coil motor 22. Here, the digital signal processor 51 realizes the clipping circuit 15, the functions of the filter 19 and the signal compensators 16 and 20 with the digital operation so that operations such as the multiplication, addition or setting of parameters are executed under the control of a microprocessor 60. Generally speaking, the amplitude of the tracking error signal disperses in dependence upon the optical disk and the light head used. If the digital signal processor 51 is adopted, however, the aforementioned clip threshold values can be easily set at the optimum values in conformity with the characteristics of the recording medium and the apparatus by measuring the amplitude $E_{SRV}$ (as shown in FIG. 4B) of the tracking error signal.

What is claimed is:

1. An optical information recording and reproducing apparatus comprising:
   (a) an information recording disk medium having a plurality of tracks defined therein;
   (b) a light source for emitting a light beam;
   (c) a mirror for directing said light beam from said light source to said disk medium and for reflecting the light beam reflected from said disk medium;
   (d) drive means for driving said mirror to shift said light beam in the radial direction of said disk medium;
   (e) detecting means for detecting the light which has been reflected from said disk medium and said mirror;
   (f) circuit means for calculating the positional displacement of said light beam with respect to a target track for recording or reproduction on the basis of the output of said detecting means to output said displacement as a tracking error signal; and
   (g) processing means for clipping said tracking error signal with a predetermined value,
   whereby said mirror is biased by actuating said drive means in accordance with the output of said processing means.

2. An optical information recording and reproducing apparatus according to claim 1,
   wherein said detecting means includes two optical detectors for detecting the light which has been reflected by said disk means and said mirror, and
   wherein said circuit means includes a differential amplifier for making a difference between said two optical detectors to output as said tracking error signal a signal indicating said difference.

3. An optical information recording and reproducing apparatus according to claim 1,
   wherein said disk medium is formed thereon with spiral tracks in advance.

4. An optical information recording and reproducing apparatus according to claim 1, further comprising:
signal generating means for generating a control signal for shifting the position to be irradiated with said light beam from one track to another; and
adding means for adding said control signal and the output signal from said processing means to apply its output to said drive means.

5. An optical information recording and reproducing apparatus according to claim 1,
wherein said processing means includes a clipping circuit constructed of a hardware circuit.

6. An optical information recording and reproducing apparatus according to claim 1,
wherein said processing means includes:
an A/D converter for converting said tracking error signal to a digital value;
a processor for clipping the signal from said A/D converter with a predetermined value; and
a D/A converter for converting the output of said processor to an analog value to apply its output to said drive means.

7. An optical information recording and reproducing apparatus according to claim 1, further comprising:
a head unit carrying thereon said light source and said mirror; and
a motor adapted to be energized in accordance with the output signal from said processing means for moving said head unit in the radial direction of said tracks.

8. An optical information recording and reproducing apparatus according to claim 7, further comprising:
a low-pass filter for extracting a low-frequency component of the output signal from said processing means to energize said motor in accordance with the output signal thereof.

9. An optical information recording and reproducing apparatus according to claim 7,
wherein in accordance with the output signal of said processing means said motor moves said head unit in the radial direction of said disk medium in a manner to reduce the displacement of said mirror by said drive means.

10. An optical information recording and reproducing apparatus comprising;
(a) an information recording disk medium having a plurality of tracks defined therein:
(b) a light source for emitting a light beam;
(c) a mirror for directing said light beam from said light source to said disk medium and for reflecting the light beam reflected from said disk medium;
(d) a head unit carrying thereon said light source and said mirror and made movable in the radial direction of said disk medium;
(e) first drive means for driving said mirror to shift said light beam in the radial direction of said disk medium;
(f) second drive means for moving said head unit in the radial direction of said disk medium;
(g) detecting means for detecting the light which has been reflected from said disk medium and said mirror;
(h) circuit means for calculating the positional displacement of said light beam with respect to a track for recording or reproduciton on the basis of the output of said detecting means to output said displacement as a tracking error signal; and
(i) processing means for clipping the output signal of said circuit means with a predetermined value,
whereby said mirror is biased by actuating said first drive means in accordance with the output of said processing means, and
whereby said head unit is moved by actuating said second drive means.

11. An optical information recording and reproducing apparatus according to claim 10,
wherein said detecting means includes two optical detectors for detecting the light which has been reflected by said disk means and said mirror, and
wherein said circuit means includes a differential amplifiter for making a difference between said two optical detectors to output as said tracking error signal a signal indicating said difference.

12. An optical information recording and reproducing apparatus according to claim 10,
wherein said disk medium is formed thereon with spiral tracks in advance.

13. An optical information recording and reproducing apparatus according to claim 10, further comprising:
signal generating means for generating a control signal for shifting the position to be irradiated with said light beam from one track to another; and
adding means for adding said control signal and the output signal from said processing means to apply its output to said first drive means.

14. An optical information recording and reproducing apparatus according to claim 13,
wherein said signal generating means generates said control signal each time said light beam is shifted from one track to an adjacent track.

15. An optical information recording and reproducing apparatus according to claim 10,
wherein said processing means includes a clipping circuit constructed of a hardware circuit.

16. An optical information recording and reproducing apparatus according to claim 10,
wherein said processing means includes:
an A/D converter for converting the output signal of said circuit means to a digital value;
a processor for clipping the signal from said A/D converter with a predetermined value; and
a D/A converter for converting the output of said processor to an analog value to apply its output to said first drive means.

17. An optical information recording and reproducing apparatus according to claim 10, further comprising:
a low-pass filter for extracting a low-frequency component of the output signal from said processing means to energize said second drive means in accordance with the output signal thereof.

18. An optical information recording and reproducing apparatus according to claim 10,
wherein in accordance with the output signal of said processing means said second drive means moves said head unit in the radial direction of said disk medium in a manner to reduce the displacement of said mirror by said first drive means.

19. An optical information recording and reproducing apparatus comprising:
(a) an information recording disk medium having a plurality of tracks defined therein;
(b) a light source for emitting a first light beam;

(c) a mirror for directing said first light beam from said light source to said disk medium and for reflecting a second light beam reflected from said disk medium;

(d) a head unit carrying thereon said light source and said mirror and made movable in the radial direction of said disk medium;

(e) first drive means for driving said mirror to shift said light beam in the radial direction of said disk medium;

(f) second drive means for moving said head unit in the radial direction of said disk medium;

(g) detecting means for detecting said second light beam which has been reflected from said disk medium and said mirror;

(h) circuit means for calculating the positional displacement of said first light beam with respect to a track for recording or reproduction on the basis of the output of said detecting means to output said displacement as a tracking error signal;

(i) clipping means for clipping the output signal from said circuit means with a predetermined value, (j) a first servo circuit for applying the output signal of said clipping circuit to said first drive means; and (k) a second servo circuit for applying the output signal of said clipping circuit to said second drive means.

20. An optical information recording and reproducing apparatus according to claim 19,
wherein said first servo circuit includes:
signal generating means for generating a control signal for shifting the position to be irradiated with said first light beam from one track to another; and
adding means for adding the control signal of said signal generating means and the output signal from said clipping circuit to apply its output to said first drive means,
whereby said first drive means is controlled on the basis on the output of said adding means.

21. An optical information recording and reproducing apparatus according to claim 19,
wherein said second servo circuit includes:
a low-pass filter for extracting a low-frequency component from the output signal of said clipping circuit.

22. An optical information recording and reproducing apparatus comprising:
(a) a disk-shaped recording medium having a plurality of tracks formed to have a spiral shape;
(b) a light source for emitting a first light beam;
(c) a mirror for changing the optical path of a second light beam reflected from said recording medium to direct said first light beam from said light source to said disk medium and to reflect said second light beam;

(d) a beam splitter for allowing said first beam from said light source to pass therethrough and for dividing the optical path of the second light beam, which has been reflected from said mirror, from that of said first light beam;

(e) a head unit carrying thereon said light source, said mirror and said beam splitter and made movable in the radial direction of said recording medium;

(f) first drive means for driving said mirror to shift said first light beam in the radial direction of said disk-shaped recording medium;

(g) second drive means for moving said head unit in the radial direction of said disk-shaped recording medium;

(h) a plurality of optical detectors for detecting said second light beam which is obtained through said beam splitter;

(i) a differential amplifier for making a difference in the output signals from said plural optical detectors;

(j) a clipping circuit for clipping the output signal of said differential circuit with a predetermined value;

(k) a signal generating means for generating a control signal for shifting that position on said recording medium, which has been irradiated with said first light beam, from one track to another;

(l) adding means for adding the output signal of said clipping circuit and the output signal of said signal generating means to generate signal for controlling said first drive means; and (m) a servo circuit for controlling said second drive means on the basis of the output signal from said clipping circuit so that said head unit may be moved in the radial direction of said disk-shaped recording medium to reduce the displacement of said mirror.

23. An optical information recording and reproducing apparatus according to claim 22,
wherein said servo circuit includes:
a low-pass filter for extracting a low-frequency component from the output signal of said clipping circuit.

24. An optical information recording and reproducing apparatus according to claim 22,
wherein said signal generating means generates said control signal each time said first light beam jumps from one track to an adjacent track.

* * * * *